June 14, 1949.                F. F. MILLER, JR                 2,473,036
                      CONSTANT VELOCITY UNIVERSAL JOINT
Filed July 5, 1944                                          2 Sheets-Sheet 1

INVENTOR.
FRED F. MILLER JR.
BY
Whittemore Hulbert & Belknap
ATTORNEYS

June 14, 1949.  F. F. MILLER, JR  2,473,036
CONSTANT VELOCITY UNIVERSAL JOINT

Filed July 5, 1944  2 Sheets-Sheet 2

INVENTOR.
FRED F. MILLER JR.
BY
Whittemore Hulbert+Belknap
ATTORNEYS

Patented June 14, 1949

2,473,036

UNITED STATES PATENT OFFICE 2,473,036

CONSTANT VELOCITY UNIVERSAL JOINT

Fred F. Miller, Jr., Berkley, Mich., assignor to The Gear Grinding Machine Company, Hamtramck, Mich., a corporation of Michigan Application July 5, 1944, Serial No. 543,522

3 Claims. (Cl. 64—21)

The invention relates to torque transmitting universal joints of the constant velocity type.

It is the object of the invention to obtain a simple construction which can be manufactured at relatively low cost and which has various advantages over constructions of the type heretofore produced.

With these objects in view the invention consists in the construction as hereinafter set forth.

Figure 1:
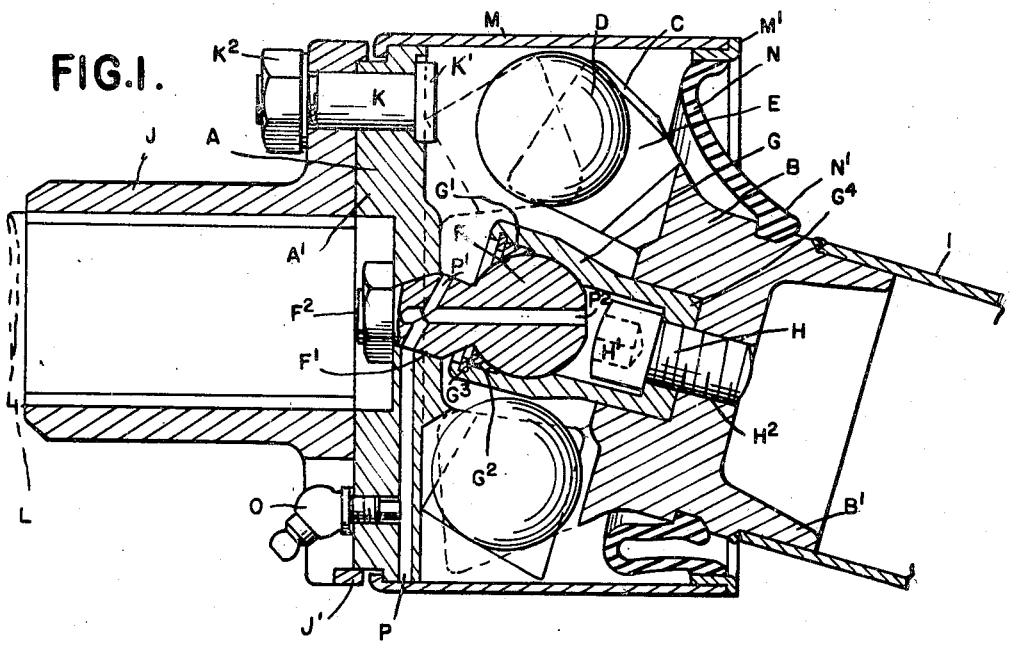
Fig. 1 is a longitudinal section showing the two members in the relative positions of maximum angular adjustment.
Figure 4:
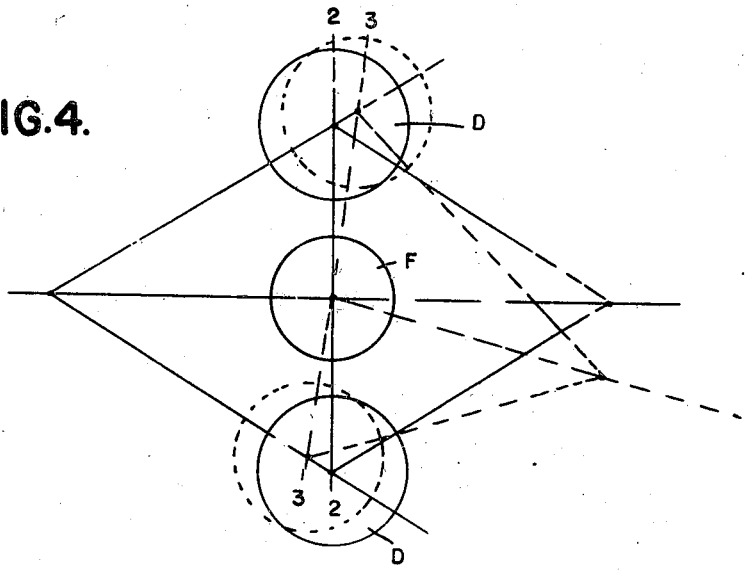
Fig. 4 is a diagram illustrating the principle of operation.
Figure 2:
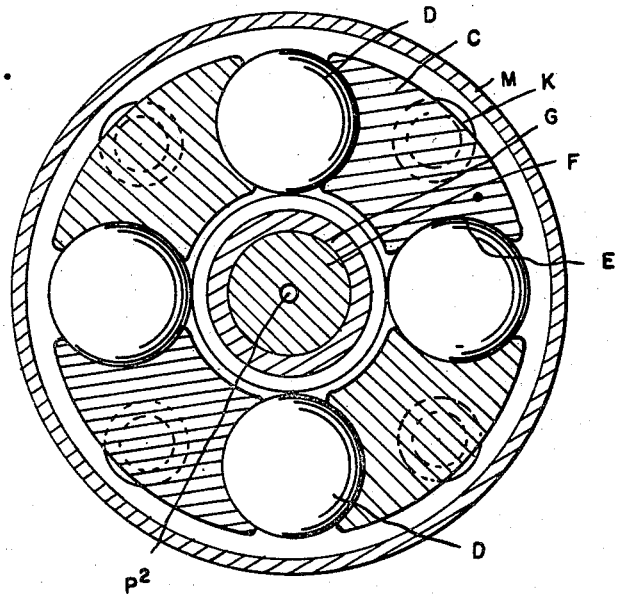
Fig. 2 is a cross section through Fig. 1 on line 2—2, Fig. 4.
Figure 3:
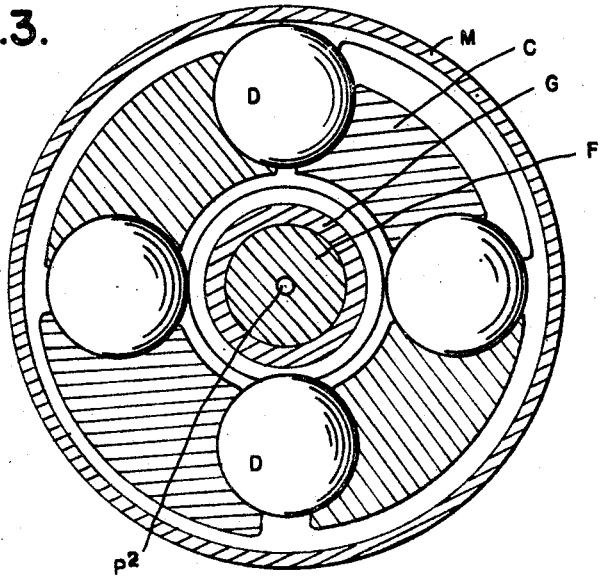
Fig. 3 is a cross section through Fig. 1 on line 3—3, Fig. 4.

As illustrated, A and B are the two main shaft connecting members of the universal joint which are provided with axially extending interspersed lugs C with torque transmitting balls D therebetween. The opposite faces of the lugs C in the two members are fashioned to form grooves E for receiving and embracing the balls D, said grooves being inclined at a predetermined angle to the axis of the member. As specifically shown, the axis of each of the groves is at an angle of 30° to the axis of the shaft so that the grooves in the opposed faces are oppositely inclined with respect to each other. Thus, assuming that the two members move angularly with respect to each other about a fixed intersecting point in the axes thereof, the balls will be maintained always in a plane which bisects the angles between these axes. However, as thus far described, there is no connection between the members A and B which would maintain them in such relation. I have, therefore, provided a central tie connection between the members A and B which is independent of and spaced from the lugs C and includes a non-torque transmitting universal joint at the center thereof. This, as shown, comprises a ball member F having a tapered shank F" terminating in a threaded end portion $F^2$. There is also a spherical socket member G for receiving the ball F and which has an annular bearing member G' for retaining the ball and which is itself retained by a snap ring $G^2$ engaging a groove $G^3$. The member G has a cylindrical shank portion $G^4$ engaging a socket in the member B and retained by a bolt H. This bolt has a head portion H' engaging a recess in the member G beyond the spherical socket portion thereof, while the threaded portion of the bolt engages a correspondingly threaded recess $H^2$ in the member B. The members A and B may be attached to their respective shafts by any suitable means but, as shown, a tubular shaft I is welded or otherwise secured to a hollow tapered shank portion B' of the member B. The member A has a circular disc-shaped head A' which is secured to a flanged hub member J by a series of bolts K and a shaft L engages the hub J. For retaining the lubricant a cylindrical casing member M is attached at one end to the disc A' and is connected at its opposite end by a flexible boot N to the member B.

To assemble the parts the socket member G is attached to the member B by the bolt H and the member F is secured in the socket by the annular bearing G' and snap ring $G^2$. The members A and B may then be assembled with each other by placing the balls D in the grooves E and inserting the tapered shank F" into its tapered seat in the disc A'. The nut $F^2$ is then engaged with the threaded portion of the shank F" to clamp it firmly to the member A. The boot N has its inner periphery secured in a groove N' in the member B and its outer periphery is attached to the casing member N by a detachable cap member M'. When all of the parts are assembled, lubricant may be introduced through a connecting fitting O from which passages P, P' and $P^2$ extend to direct the lubricant to the various bearing surfaces.

In operation, the non-torque transmitting universal joint, together with the shanks $G^4$ and F" and connecting screw H and nut $F^2$, constitute a tie connection which compels the joint to swing about the center of the ball F. This prevents the members A and B from separating from each other and, as the grooves E envelop the balls D, the latter are retained from displacement. However, in the angular movement of the joint the balls will be moved radially inward and outward but will always remain in a plane which bisects the angle between the axes of the members A and B.

One important feature of my invention is that the central tie connection will always hold the center of oscillation of the joint in fixed relation to both of the principal members. This is for the reason that in the non-torque transmitting universal joint the ball is substantially surrounded by the spherical socket so as to prevent any relative movement thereof other than about the center. Also, both the socket member and the ball member are rigidly positioned with respect to their corresponding main members, This will hold the latter from any displacement relative to each other, other than angular movement about the center of the tie member. Furthermore, this is accomplished without assistance of the torque transmitting structure so that any wear in the elements of the latter will not change the centered relation of the main members. This is important for if there is any shifting of the center of oscillation when the joint is revolving at high speed, vibrations will be created which are very detrimental.

Another advantage of the construction is that the grooves in the lugs diverge from each other in an outward direction. This greatly facilitates manufacture permitting all of the grooves to be simultaneously drilled or otherwise fashioned without interference with each other.

Still another advantageous feature is the means for securing the member A to its shaft coupling member. It will be noted that the bolts K have heads K' at their inner ends while the body portion of each bolt is a press fit in the bore therefor in the member A'. This leaves the end portions of the bolt projecting outward from the member A for engagement with registering apertures in the member J or other means for shaft attachment. Also, the periphery of the circular head A' forms a pilot for centering the member J which latter has a flange J' overlapping said peripheral portion. Consequently, when the nuts K² on the bolts K are tightened, the member J is held in rigid alignment with the member A.

What I claim as my invention is:

1. A constant velocity torque transmitting universal joint comprising a pair of rotary members having oppositely axially extending interspersed lugs, the opposed faces of adjacent lugs being fashioned with grooves therein with the axes of said grooves extending at an oblique angle to and outwardly diverging from the axis of the corresponding member, balls in said grooves and enveloped thereby to be retained from disengagement, and a central tie connection between said members including a ball member having a tapered shank and a threaded portion at the end of said shank, a socket member engaging said ball, an annular bearing for securing said ball in said socket member and a snap ring for retaining said bearing in engagement with said socket member, said socket member having a hollow shank portion engaging a recess in one of said rotary members, a headed bolt within said hollow shank for securing the same to the member with which it is engaged, the other of said rotary members being provided with a tapered socket for receiving said tapered shank and a nut for engaging the threaded portion of said shank and clamping the same in engagement with its socket.

2. A torque transmitting universal joint comprising a pair of rotary main members having oppositely axially extending interspersed lugs, the opposed faces of the lugs in the two members being fashioned with complementary grooves each extending obliquely to and outwardly diverging from a point in the axis of its corresponding member, balls in said grooves, and a central axial tie connection between said members independent of and spaced from said lugs, said tie connection including members rigidly connected respectively with said main members and having a non-torque transmitting ball and socket fixed center universal joint therebetween said socket completely surrounding said ball whereby said main members are always held to a fixed center of oscillation.

3. A torque transmitting universal joint comprising a pair of rotary main members having oppositely axially extending pairs of interspersed lugs, the lugs of each pair having in the radially extending opposite faces thereof ball receiving grooves each having a rectilinear axis which is oblique to and diverging from a point in the axis of rotation of its corresponding member, one of said main members having between the lugs thereof a ball member rigidly connected to said member by a shank and the other of said main members having rigid therewith a socket for engaging said ball and completely surrounding the same circumferentially about the axis of rotation thereof, and a detachable engagement means between one of said ball and socket portions and its corresponding main member.

FRED F. MILLER, Jr.

REFERENCES CITED

The following references are of record in the file of this patent:

UNITED STATES PATENTS

| Number | Name | Date |
|---|---|---|
| 1,677,311 | Weiss | July 17, 1928 |
| 1,774,578 | Weiss | Sept. 2, 1930 |
| 2,134,508 | Floyd | Oct. 25, 1938 |
| 2,217,969 | Schairer | Oct. 15, 1940 |
| 2,323,569 | Rzeppa | July 6, 1943 |